US010226740B2

(12) United States Patent
Wallace (10) Patent No.: US 10,226,740 B2
(45) Date of Patent: Mar. 12, 2019

(54) MEMBRANE AND ELECTRODIALYSIS BASED SEAWATER DESALINATION WITH SALT, BORON AND GYPSUM RECOVERY (71) Applicant: HL Seawater Holdings, LLC, Houston, TX (US)

(72) Inventor: Paul Steven Wallace, Katy, TX (US)

(73) Assignee: HL Seawater Holdings, LLC, Houston, TX (US)

( * ) Notice: Subject to any disclaimer, the term of this patent is extended or adjusted under 35 U.S.C. 154(b) by 773 days.

(21) Appl. No.: 14/643,833

(22) Filed: Mar. 10, 2015

(65) Prior Publication Data

US 2015/0251137 A1    Sep. 10, 2015

Related U.S. Application Data (63) Continuation of application No. 13/185,341, filed on Jul. 18, 2011, now Pat. No. 8,999,171.

(51) Int. Cl.
| *B01D 61/02* | (2006.01) |
| *B01D 61/44* | (2006.01) |
| *B01D 61/58* | (2006.01) |
| *C02F 1/44* | (2006.01) |
| *C02F 1/469* | (2006.01) |

(Continued)

(52) U.S. Cl.
CPC .......... *B01D 61/027* (2013.01); *B01D 61/02* (2013.01); *B01D 61/025* (2013.01); *B01D 61/44* (2013.01); *B01D 61/58* (2013.01); *C02F 1/44* (2013.01); *C02F 1/441* (2013.01); *C02F 1/442* (2013.01); *C02F 1/4693* (2013.01); *B01D 2311/04* (2013.01); *B01D 2311/103* (2013.01); *C02F 2101/10* (2013.01); *C02F 2103/08* (2013.01)

(58) Field of Classification Search
CPC .. B01D 61/027; B01D 61/022; B01D 61/422; B01D 2311/04; B01D 2311/103; B01D 2311/08; B01D 2311/06; B01D 2311/2684; B01D 2311/2653; B01D 2311/2657; C02F 1/44; C02F 1/442; C02F 1/4693; C02F 1/58; C02F 2103/08
See application file for complete search history.

(56) References Cited

U.S. PATENT DOCUMENTS 4,127,235 A    11/1978    Klaile et al.
4,163,046 A    7/1979    Subramanian et al.
(Continued)

FOREIGN PATENT DOCUMENTS

WO    2007094659 A1    8/2007

OTHER PUBLICATIONS

Black and Veatch Corporation. Evaluation and assessment of removal technology for specific organic contaminants in NJ drinking water (Nov. 2008) 1-47. (Year: 2008).*

(Continued)

*Primary Examiner* — Katherine Zalasky
(74) *Attorney, Agent, or Firm* — Fletcher Yoder, P.C.

(57) ABSTRACT

A method of producing desalinated water and recovering minerals from the feedwater uses membrane separation and electrodialysis brine concentration. This process can recover all of the minerals as high purity industrial minerals, including capturing the calcium and sulfate as agricultural grade gypsum and boron as high purity boric acid. In addition the process allows the use of low cost lime or dolime to produce valuable magnesium hydroxide.

18 Claims, 3 Drawing Sheets (51) Int. Cl.
  *C02F 101/10* (2006.01)
  *C02F 103/08* (2006.01)

(56) References Cited

U.S. PATENT DOCUMENTS

| | | | |
|---|---|---|---|
| 4,298,442 A | 11/1981 | Giuffrida | |
| 4,381,232 A | 4/1983 | Brown | |
| 4,405,463 A | 9/1983 | Jost et al. | |
| 4,436,429 A | 3/1984 | Strong et al. | |
| 4,725,425 A | 2/1988 | Lesher et al. | |
| 4,789,460 A * | 12/1988 | Tabler | C10M 175/0016 208/177 |
| 5,221,528 A | 6/1993 | Jongema | |
| 5,250,185 A | 10/1993 | Tao et al. | |
| 5,366,514 A | 11/1994 | Becnel, Jr. et al. | |
| 5,417,491 A | 5/1995 | Hornung et al. | |
| 5,681,728 A * | 10/1997 | Miao | B01D 61/44 204/519 |
| 5,765,945 A | 6/1998 | Palmer | |
| 5,858,240 A | 1/1999 | Twardowski et al. | |
| 5,925,255 A | 7/1999 | Mukhopadhyay | |
| 6,030,535 A | 2/2000 | Hayashi et al. | |
| 6,036,740 A | 3/2000 | Miller et al. | |
| 6,113,797 A * | 9/2000 | Al-Samadi | B01D 61/022 210/650 |
| 6,183,644 B1 | 2/2001 | Adams et al. | |
| 6,280,630 B1 * | 8/2001 | Ramsay | C02F 1/52 210/711 |
| 6,461,491 B1 | 10/2002 | Hryn et al. | |
| 6,482,305 B1 | 11/2002 | Mani | |
| 7,083,730 B2 | 8/2006 | Davis | |
| 7,147,361 B2 | 12/2006 | Cecala et al. | |
| 7,392,848 B1 | 7/2008 | Bader | |
| 7,459,088 B2 | 12/2008 | Davis | |
| 7,501,064 B2 | 3/2009 | Schmidt et al. | |
| 7,520,993 B1 * | 4/2009 | Laraway | B01D 61/58 210/175 |
| 7,595,001 B2 | 9/2009 | Arakel et al. | |
| 7,861,955 B2 | 1/2011 | Tracy et al. | |
| 2007/0189945 A1 | 8/2007 | Kopp et al. | |
| 2007/0284251 A1 * | 12/2007 | Zuback | B01D 61/425 204/518 |
| 2008/0035565 A1 * | 2/2008 | Enric | B01D 61/022 210/639 |
| 2008/0067125 A1 * | 3/2008 | Wilkins | B01D 61/58 210/641 |
| 2008/0185340 A1 | 8/2008 | Bargeman et al. | |
| 2008/0237123 A1 | 10/2008 | Marston | |
| 2009/0127360 A1 | 5/2009 | Tracy et al. | |
| 2010/0163471 A1 | 7/2010 | Elyanow et al. | |
| 2011/0198285 A1 | 8/2011 | Wallace | |
| 2011/0289846 A1 | 12/2011 | Shaw et al. | |
| 2011/0303607 A1 | 12/2011 | Vora et al. | |

OTHER PUBLICATIONS

Ohya et al. Integrated system for complete usage for components in seawater: A proposal of inorganic chemical combinat on seawater. Desalination 134 (2001) 29-36. (Year: 2001).*
Balarew, Chr. Solubilities in seawater-type systems: Some technical and environment friendly applications. Pure & Appl. Chem. vol. 65, No. 2 (1993) 213-218. (Year: 1993).*
McDonald, M. R., McClintock, J. B., Amsler, C. D., Rittschoff, D., Angus, R. A., Orihuela, B. & Lutostankski, K., "Effects of Ocean Acidification Over the Life History of the Barnacle Amphibalanus Amphitrite," Marine Ecology Progress Series 385:179-187 (2009).
Markus Busch, William E. Mickols, Steve Jons, Jorge Redondo, Jean De Witte, "Boron Removal in Sea Water Desalination," International Desalination Association, BAH03-039 (2003).
NRS Engineering Water Solutions, "Final Pilot Study Report—Texas Seawater Desalination Demonstration Project," (Oct. 2008).
Collin Green "Using Gypsum for the Treatment of Mine Water," Department of Chemical and Metallurgical Engineering, Faculty of Natural Sciences, Technikon Pretoria (Dec. 2003).
Stephen R. Grattan "Irrigation Water Salinity and Crop Production," University of California, Davis—Agriculture and Natural Resources, ANR Publication 8066 (2002).
Ittai Gavrieli Amos Bein, and Aharon Oren, "The Expected Impact of the Peace Conduit Project (The Red Sea-Dead Sea Pipeline) on the Dead Sea," Mitigation and Adaptation Strategies for Global Change, 10:3-22 (2005).
DOW Water Solutions, "Filmtec™ Reverse Osmosis Membranes," Technical Manual, Form No. 609-00071; (2010) pp. 1-180.
DOW Water Solutions, "DOW™ Filmtec™ Membranes—DOW™ Filmtec™ SW30XLE-440i Seawater Reverse Osmosis Element with iLEC Interlocking Endcaps," Product Information. Form No. 609-03003-1109; (2010) pp. 1-2.
DOW Water Solutions, "DOW™ Filmtec™ Membranes—DOW™ Filmtec™ SW30ULE-440i Seawater Reverse Osmosis Element with iLEC™ Interlocking Endcaps," Product Information, Form No. 609-03004-1109; (2010) pp. 1-2.
DOW Water Solutions, "Filmtec™ Membranes—Filmtec™ XLE-440 Extra Low Energy RO Element," Product Information. Form No. 609-00245-0606; (2010) pp. 1-2.
DOW Water Solutions, "DOW™ Ultrafiltration—High Turbidity and Temperature Fluctuation No Obstacle for DOW™ Ultrafiltration," Case History, Form No. 795-00020-1108; (2010) pp. 1-5.
FAO Corporate Document Repository, Agriculture and Consumer Protection, "Water Quality for Agriculture"; http://www.fao.org/DOCREP/003/T0234E/TO234E05.htm (Feb. 10, 2010) pp. 1-15.
Seung-Hyun Kim, Jong-Sup Yoon, Seockheon Lee, "Utilization of Floc Characteristics for the Evaluation of Seawater Coagulation Process," Desalination and Water Treatment, Civil Engineering Department, Kyungnam University, Masan, Korea, 10 (2009) 95-100. *Presented at EuroMed 2008.
GE Water and Process Technologies, "Cloromat—Solution for Manufacturing Chlor-Alkali Chemicals: Sodium Hypochlorite, Hydrochloric Acid & Caustic Soda," Fact sheet (May 2008) p. 1-4.
GE Power & Water—Water & Process Technologies, "HERO" (2010) pp. 1-2.
ICL, "Harnessing Nature Creating Value," 3rd Annual NASDAQ-TASE Israeli Investor Conference, New York (Sep. 18, 2008) pp. 1-47.
Applied Membranes, Inc., "Water Treatment Guide—Temperature Correction Factor for Reverse Osmosis Membranes," (2007) pp. 1-2.
Nitto Denko and Hydranautics, "Chemical Pretreatment for RO and NF," Technical Application Bulletin No. 111, Revision C (Dec. 2008) pp. 1-16.
Chemical Processign.com, "To Avoid Silica-Scale Problems in Cooling Towers, Plant Personnel Turn to Unconventional Methods," Water Treatment's Gordion Knot; http://www.chemicalprocessing.com/articles/2003/235.html?page=print; (2003) pp. 1-9.
"Desalination: A National Perspective," Committee on Advancing Desalination Technology, National Research Council, The National Academies—Advisers to the Nation on Science, Engineering, and Medicine (2008) pp. 1-255.
Public Health and the Environment World Health Organization, "Desalination for Safe Water Supply—Guidance for the Health and Environmental Aspects Applicable to Desalination," Geneva (2007) pp. 1-173.
Gerald L. Mackie and Barb Crosbie, "Zebra Mussel Biofouling Control in Cottage and Other Small Volume Water Systems," The Georgian Bay Association (1999) pp. 1-87.
Ki-Won Baek, Sang-Hun Song, Seok-Hwan Kang, Young-Woo Rhee, Chang-Soo Lee, Bum-Jae Lee, Sam Hudson, and Taek-Sung Hwang, "Adsorption Kinetics of Boron by Anion Exchange Resin in Packed Column Bed," J. Ind. Eng. Chem., vol. 13, No. 3, (2007) 452-456.
EPA Selenium Purification_Scandium (1998) pp. 1-62.
Yoshinobu Tanaka, Reo Ehara, Sigeru Itu, Totem Goto, "Ion-exchange membrane electrodialytic salt production using brine discharged from a reverse osmosis seawater desalination plant," Journal of Membrane Science 222 (2003) 71-86.

(56) References Cited

OTHER PUBLICATIONS

Reclamation—Managing Water in the West, Desalination and Water Purification Research and Development Program Report No. 135, Pilot Testing of Zero-Discharge Seawater Desalination-Application to Selenium Removal from Irrigation Drainage, U.S. Department of the Interior Bureau of Reclamation, Apr. 2008, pp. 1-37.
Sallie J. Lee, Frank J. Liotta, Steven A. Schwartz, "A New Generation of Gypsum Dispersing Agents," Global Gypsum Conference 2003—Barcelona, Sep. 14-16, 2003, pp. 17.1-17.12.
T. Masuzawa, "Impurities Contained Inside the Crystals of Solar and Vacuum Evaporated Salts," Fifth International Symposium on Salt—Northern Ohio Geological Society, May 29-Jun. 1, 1979, Hamburg, Germany, pp. 463-473.
Seung Joon Kim, Young Geun Lee, Sanghoun Oh, Yun Seok Lee, Young Mi Kim, Moon Gu Jeon, Sangho Lee, in S. Kim, Joon Ha Kim, "Energy saving methodology for the SWRO desalination process: controrl of operating temperature and pressure," Desalination 249 (2009) 260-270.
Peter Eriksson, Markus Kyburz, Wil Pergande, "NF membrane characteristics and evaluation for sea water processing applications," Desalination 184 (2005) 281-294.
EPA Selenium Purification (1991) pp. 1-8.

\* cited by examiner

MEMBRANE AND ELECTRODIALYSIS BASED SEAWATER DESALINATION WITH SALT, BORON AND GYPSUM RECOVERY

CROSS REFERENCE TO RELATED APPLICATIONS

This application is a continuation of U.S. patent application Ser. No. 13/185,341, entitled "MEMBRANE AND ELECTRODIALYSIS BASED SEAWATER DESALINATION WITH SALT, BORON AND GYPSUM RECOVERY", filed Jul. 18, 2011, which is herein incorporated by reference in its entirety.

BACKGROUND

Field of the Invention

The invention is generally related to desalination of sea water and is specifically directed to a desalination system adapted for recovering minerals from the feedwater.

Discussion of the Prior Art

Japan has used electrodialysis (ED) to recover NaCl from seawater to produce edible salt on a large scale for about 40 years. ED plants have been installed to recover NaCl from seawater to use in chlor-alkali plants. The benefit of recovering NaCl from reverse osmosis (RO) concentrate is that the starting salt concentration is twice that of seawater.

Typically, the energy consumption of salt manufactured with seawater reverse osmosis (SWRO) rejects the feed to an ED plant is 80% of that with seawater as the feed (see: Tanaka, Y., Ehara, R., Itoi, S. and Goto, T. "Ion-exchange membrane electrodialytic salt production using brine discharged from a reverse osmosis seawater desalination plant," J. Membrane Sci. 222, 71-86, 2003. 2003).

The idea of combining seawater reverse osmosis (RO) and ED to produce freshwater and NaCl is disclosed in U.S. Pat. No. 6,030,535, as well as a zero discharge flow scheme using RO, ED, NF, caustic (NaOH) precipitation of magnesium hydroxide, and evaporation, see for example, U.S. Pat. No. 7,083,730. However neither of these patents addresses gypsum or boron recovery or removal. In addition the silica is not removed in the ED or NF sections, potentially creating scaling on the membranes when operated with the recycle required for zero discharge.

Gypsum scaling is a well known problem in seawater reverse osmosis (RO) plants and especially in zero discharge desalination plants. Sulfate composes approximately 8 wt % and calcium composes 1-1.5 wt % of the total dissolved solids in seawater. When concentrated the sulfate and calcium in the seawater react to form insoluble gypsum.

Concentration occurs in zero discharge or limited discharge plants due to the extraction of desalinated water and recycle of the brine streams without adequate removal of calcium and sulfate. Periodic polarity reversal is used in ED to limit gypsum and calcium carbonate scaling. However, the recycling required for zero discharge can exceed the limits even with polarity reversal.

U.S. Pat. No. 6,030,535 discloses an ED membrane that is not permeable to sulfate to prevent gypsum formation in the ED concentrate stream. However, significant sulfate and calcium is recycled from the ED diluate stream back to the RO unit potentially creating gypsum scaling on the RO membranes. A large portion of the low salt content ED diluate (2 wt % dissolved salt) must be taken as a discharge purge back to the sea to limit the calcium and sulfate concentration in the RO unit brine discharge stream. It would be desirable to fully utilize the ED diluate stream to produce desalinated water since it contains less salt (2 wt %) than the feed seawater (3.5 wt %).

U.S. Pat. No. 7,083,730 discloses partial soda ash softening of the feed seawater to remove most of the calcium to prevent gypsum scaling. However, this requires a significant amount of caustic and soda ash addition and produces a mixed calcium carbonate, magnesium carbonate softener sludge—for disposal. This increases the operating cost of the plant due to the chemical feed cost, sludge disposal cost and loss of byproduct magnesium hydroxide.

The '730 patent provides for valuable magnesium hydroxide production, but due to the presence of sulfate in the magnesium rich brine stream low cost lime or dolomitic lime cannot be used to precipitate the magnesium hydroxide without contaminating it with gypsum. Caustic (NaOH) must be used which is more expensive. Approximately 1.4 tons of NaOH are required to produce 1 ton of $Mg(OH)_2$. Since the market prices for both NaOH and $Mg(OH)_2$ are typically equal it is not profitable to produce $Mg(OH)_2$ using caustic.

Dolomitic lime is used commercially to precipitate $Mg(OH)_2$ from seawater. Approximately 0.85 tons of dolomitic lime (CaO+MgO) is required to produce 1 ton of $Mg(OH)_2$. The typical market price for dolomitic lime is 30-50% of the price of $Mg(OH)_2$ making its recovery using dolomitic lime profitable. Thus it would be economically desirable to develop an enhanced RO and ED based desalination flow scheme that would allow the use of dolomitic lime to precipitate the magnesium from the seawater brine.

None of the known prior art patent addresses the issue of dissolved boron build up in the recycle ED diluate stream to the RO unit. Boron in the form of uncharged boric acid is a component in seawater that typically must be removed at a 90-95% net rejection from the seawater to produce drinking water and agriculture water that meets the World Health Organization guidelines (0.5 ppm B). Since boron is uncharged this is difficult to achieve with RO membranes even on a once through basis.

In the ED and NF units the uncharged boron remains with the diluate and permeate streams and is recycled to the RO unit. This increases its concentration several fold in the feed stream to the RO causing breakthrough into the desalinated product water.

As described in U.S. Pat. Nos. 4,298,442; 5,250,185; and 5,925,255, by raising the pH to 10-10.5 nearly all (>95%) of the uncharged boric acid is converted to monovalent borate and the uncharged silica is converted to monovalent silicate. This allows the borate and silicate to be captured in the ED concentrate stream. This prevents build up in the recycle ED diluate and membrane scaling. However, as explained in U.S. Pat. No. 5,925,255 the calcium and magnesium content must be reduced to very low levels (<<1 ppm) using upstream ion exchange, and bicarbonate must be essentially removed (<<10 ppm) to prevent $CaCO_3$ or $Mg(OH)_2$ scaling. Although U.S. Pat. No. 5,925,255 allows a simple single pass removal of boron and silica with the dissolved salts, it is not economically feasible for seawater desalination due to the large volume of water that would need to be treated and high magnesium and calcium content in seawater (>1500 ppm). If the ED feedwater pH were raised to 10 a portion of the bicarbonate in the seawater brine would be converted to carbonate and could form a carbonate scale with the calcium dissolved in the ED feedwater. In addition magnesium in the seawater could form magnesium hydroxide and foul the membranes.

U.S. Pat. No. 7,083,730 discloses the use of partial soda ash softening to remove some of the bicarbonate and calcium. However, significant calcium and bicarbonate remain in the feed seawater (typically >50 ppm bicarbonate and >100 ppm calcium) along with most of the magnesium. This gets concentrated in the RO brine and still could form calcium carbonate or magnesium hydroxide precipitate in the ED unit at pH 10. It would be desirable to develop an enhanced RO and ED based desalination flow scheme that would allow the ED to operate at a pH of 10 allowing boron and silica rejection without calcium carbonate or magnesium hydroxide scale formation.

In U.S. Pat. No. 7,083,730 boron contamination of the magnesium rich brine is also a problem for magnesium hydroxide production. The presence of boron is undesirable since it is adsorbed onto the surface of the of the magnesium hydroxide particles, making the magnesium hydroxide unsuitable for refractory brick applications. Additional treatment of the brine (ion exchange, excess lime addition) is required if significant boron is present. It would be desirable to develop an enhanced RO and ED based desalination flow scheme that would produce magnesium rich brine that has a low boron content allowing high purity magnesium hydroxide production without additional treatment steps.

Published US Application, Pub. No. 2008/0237123, discloses a method of regenerating N-Methyl-D-glu-camine-functional resin that has been used for boron-removal uses a closed recirculating loop for treating the conjugate acid salt of the N-Methyl-D-glucamine functionality of the resin. The method reduces rinse water demand and improves pH control in a water treatment system, and can be used to improve the performance of boron-selective resins in standalone systems or as a second stage in a reverse osmosis seawater desalination system.

An article by Ki-Won Baek, et al, entitled: "Adsorption Kinetics of Boron by Anion Exchange Resein in Packed Column Bed," J. Ind. Eng. Chem, Vol. 13, No. 3 (007) 452-456, Discusses an application for Amberlite IRA 743 resin that has glucamine functional groups for specific boron exchange. The boron removal efficiency from seawater was examined through the packed column experiment. The efficiency of boron removal was investigated with respect to several parameters, including the pH of the solution, the initial concentration of boron, the bed volume of the resin, and the temperature. The performance of boron removal increased upon increasing the batch ratio of resin to boron and decreasing the initial concentration of boron in solution. The removal rate of boron is independent of temperature. Most of the boron in aqueous solution could be removed efficiently under the optimum operation conditions at pH 8.5. In addition, a kinetic study of boron removal under the optimum conditions fit Thomas's adsorption model well.

Many of the seawater RO plants currently in operation discharge the entire reject brine stream with no minerals recovery. It would be desirable to retrofit these plants with an ED based system that allows economic recovery of the minerals. However, the prior art systems described here recycle all or a portion of the ED diluate stream back to the RO unit. This recycle increases the flow and changes the composition of the RO feedwater. This requires modifications to an existing RO based desalination facility requiring an extended outage. In addition the change in feedwater composition may cause unforeseen scaling problems in the existing RO unit.

It would be desirable to develop an enhanced RO and ED based desalination flow scheme that could process the brine stream from an existing RO desalination plant without impacting the operation of the existing RO desalination plant.

SUMMARY OF THE INVENTION

The subject invention provides a method of producing desalinated water and recovering minerals from the feedwater using membrane separation and electrodialysis brine concentration. This process can recover all of the minerals as high purity industrial minerals, including capturing the calcium and sulfate as agricultural grade gypsum and boron as high purity boric acid. In addition the process allows the use of low cost lime or dolime to produce valuable magnesium hydroxide.

In one aspect of the invention a standalone system is described. Seawater or brackish water is routed to a solids removal pretreatment section which uses a combination of settling, filtration, and ultra-filtration to produce a feedwater stream essentially free of suspended solids. The pH of the feed water is adjusted to pH 6-6.5 as part of the pretreatment. This minimizes soluble silica in the feedwater to prevent downstream membrane fouling. Coagulants, flocculants and periodic disinfectant addition may be desired in the pretreatment section depending on the feedwater quality. The pretreated feed water is preheated using low level heat to 85-113.degree. F. and additional hydrochloric or sulfuric acid is added to reduce the pH to 4, converting essentially all of the bicarbonate to free $CO_2$. A multistage air or nitrogen stripper is then used to reduce the $CO_2$ content in the feed water to below 5 ppm. Mol sieves may be optionally used to reduce the $CO_2$ content in the stripping air.

Sodium bisulfite is added to the stripped feed water to neutralize any residual hypochlorite, or hypobromite and the water is fed to a nanofiltration unit. The nanofiltration unit removes nearly all (90-99%) of the magnesium, calcium, and sulfate in a non-permeate stream and removes very little of the boron. This stream is processed for minerals recovery to produce agricultural grade gypsum from the non-permeate stream. Excess calcium is removed from the NF brine stream as a calcium chloride brine, flake or pellet product.

The NF permeate and the purge from the NF non-permeate minerals recovery system containing the monovalent salts is adjusted to pH 9-10 using caustic and routed to a seawater RO system. The elevated pH and temperature allow optimized flux and boron removal with low pressure drop RO membranes. Multiple stages of permeate and nonpermeate RO may be used depending on the feed water quality and desal water purity requirement.

The reject brine stream from the seawater RO system, preferably with 70-80 g/l Total Dissolved Solids (TDS), is routed to an electrodialysis or electrodialysis reversal (ED (R)) unit which operates at pH 9.5-10. The elevated pH converts most of the uncharged boric acid to monovalent borate, and the uncharged silica to silicate, allowing the ED(R) unit to capture most of these ions in the concentrate stream. The ED(R) diluate stream, preferably with 20 g/l TDS, is pH adjusted to 9.5-10 using caustic and routed to a brackish water RO system which produces desalinated water.

The elevated pH and temperature allow optimized flux and boron removal. The brackish water RO membrane allows a lower pressure drop and higher recovery than the seawater RO membranes, since it is optimized for the lower TDS in the feed and reject brine.

The reject brine from the brackish water RO system is recycled back to the ED(R) unit. Silica and boron do not build up in the recycle loop since most of the silica and boron fed to the ED(R) is rejected with the concentrate due to the elevated pH.

ED(R) concentrate preferably with 230 g/l TDS is routed to a brine storage tank which facilitates off-peak salt production from the concentrate using mechanical vapor recompression (MVR) evaporators and crystallizers. The brine storage also allows the desalination plant to continue to operate when the downstream MVR units experience a forced or planned outage. Brine storage is also provided within the NF non-permeate minerals recovery system to allow desalination plant operation when one of the components in the NF non-permeate minerals recovery system is down.

The ED(R) concentrate stream from the brine tank is processed for minerals recovery. This produces high purity salt and recovers boron as high purity boric acid.

Another aspect of the invention permits incorporation of the methodology in a retrofit operation. In this case the system is retrofitted on all or a portion of the reject brine stream of an existing desalination plant. The reject brine feed stream is adjusted to pH 6-6.5 using hydrochloric acid, sulfuric acid or caustic and is filtered (cartridge filter, or ultrafiltration) to remove any suspended solids. The residual filter purge solid stream is routed back to the RO unit solids disposal line or to a separate solids settling and filtration system producing byproduct solids. The pH adjustment minimizes soluble silica in the feedwater to prevent downstream membrane fouling. The feed water stream is processed the same as the standalone embodiment except the seawater RO block is not used. The elevated TDS NF permeate stream is fed directly to the ED(R) unit. The flow scheme downstream of the ED(R) unit is the same as the standalone embodiment. No streams are recycled to the existing desalination plant.

Another embodiment of this invention is used to produce a salt brine with a further reduced calcium and magnesium content, using higher efficiency ED membranes for the bulk of the salt concentration.

The subject invention provides numerous advantages over prior art system, including, but not limited to:
1) Production of high quality desalinated water from ED(R) diluate at lower energy consumption than seawater RO membranes by using low pressured brackish water RO at pH 9-10.
2) Zero discharge seawater desalination without buildup of boron which can cause contamination of the desalinated water.
3) Zero discharge seawater desalination without buildup of silica which can cause membrane scaling and fouling.
4) Does not require specialty monovalent ED(R) membranes.
5) Can be used to as a retrofit system on an existing RO plant.
6) Desalinated water low in boron is produced with the option to recover boron as byproduct boric acid.
7) Sulfate is recovered as an Agricultural grade gypsum byproduct.
8) Magnesium is recovered as high purity magnesium hydroxide (without boron or gypsum contamination) using low cost dolime to precipitate the magnesium hydroxide.
9) Calcium carbonate, magnesium hydroxide softener sludge is not produced. Essentially all of the calcium is recovered as either agricultural gypsum or byproduct calcium chloride.

Novel Features

The novel features of the invention include but are not limited to:
1) Uses a UF, acidic air stripper and NF pretreatment system for seawater or RO brine to produce a low carbonate (<<5 ppm, 10 wCa<<200 ppm, low Mg<<100 ppm) brine ED(R) feed stream at pH 9.5-10 allowing the ED to reject the majority of the boron and silica preventing build up in the recycle stream.
2) Uses a dedicated low pressure drop brackish water RO at pH 9-10 to produce high quality desalinated water from ED(R) diluate, and a brine stream suitable for recycle to the ED(R) unit.
3) Uses the gypsum, magnesium hydroxide, calcium chloride recovery system described in co-pending patent application Ser. No. 12/818,740, filed on Jun. 18, 2010, entitled: "Zero Discharge Water Desalination Plant with Minerals Extraction Integrated with Natural Gas Combined Cycle Power Generation", to recover these minerals without passing them through the ED(R).
4) Produces a low sulfate, low calcium, low magnesium concentrated brine stream (20 wt % dissolved solids) suitable for production of salt or use in the NaCl, KCl, Br2, boric acid recovery system in Katana's previous desalination patent.

Additional Novel Features Relating to the Calcium and Magnesium Purge Configuration:

Utilizes a multistage ED and RO configuration operating at various pH's with various combinations of mono and divalent permselective membranes to separate an RO brine into the three following streams, without scale production:
1) high purity, high concentration product salt brine.
2) high concentration calcium chloride, magnesium chloride purge brine,
3) high purity product desalinated water.

Other advantages, objects and features of the invention will be readily apparent from the following detailed description of the preferred embodiments.

DETAILED DESCRIPTION

The following abbreviations and acronyms are used throughout the application:
BWRO: brackish water reverse osmosis
ED: electrodialysis
ED(R): electrodialysis reversal
g/l: grams per liter
MGD: million gallons per day
MVR: mechanical vapor recompression
NF: nano filtration
RO: reverse osmosis
SWRO: seawater reverse osmosis sTPD: short tons per day
TDS: total dissolved solids Standalone Systems Referring to FIG. 1 of the drawings, seawater or brackish water at input 12 is routed to a solids removal pretreatment section 10 which uses a combination of settling, filtration, and ultra-filtration to produce a feedwater stream essentially free of suspended solids. The pH of the feed water is adjusted to pH 6-6.5 as part of the pretreatment process using hydrochloric acid, sulfuric acid or caustic as necessary, as indicated at 14. The pH adjustment minimizes soluble silica in the feedwater to prevent downstream membrane fouling. Coagulants, flocculants and periodic disinfectant (NaOCl, chlorine) addition may be required in the pretreatment section depending on the feedwater quality. Solid amendment/landfill solids are released as indicated at 16. The pretreated feed water is preheated using low level heat to 85-113.degree. F. (preferably above 100.degree. F.) and additional hydrochloric or sulfuric acid is added as indicated at 24 to reduce the pH to 4 converting essentially all of the bicarbonate to free $CO_2$.

Figure 1:
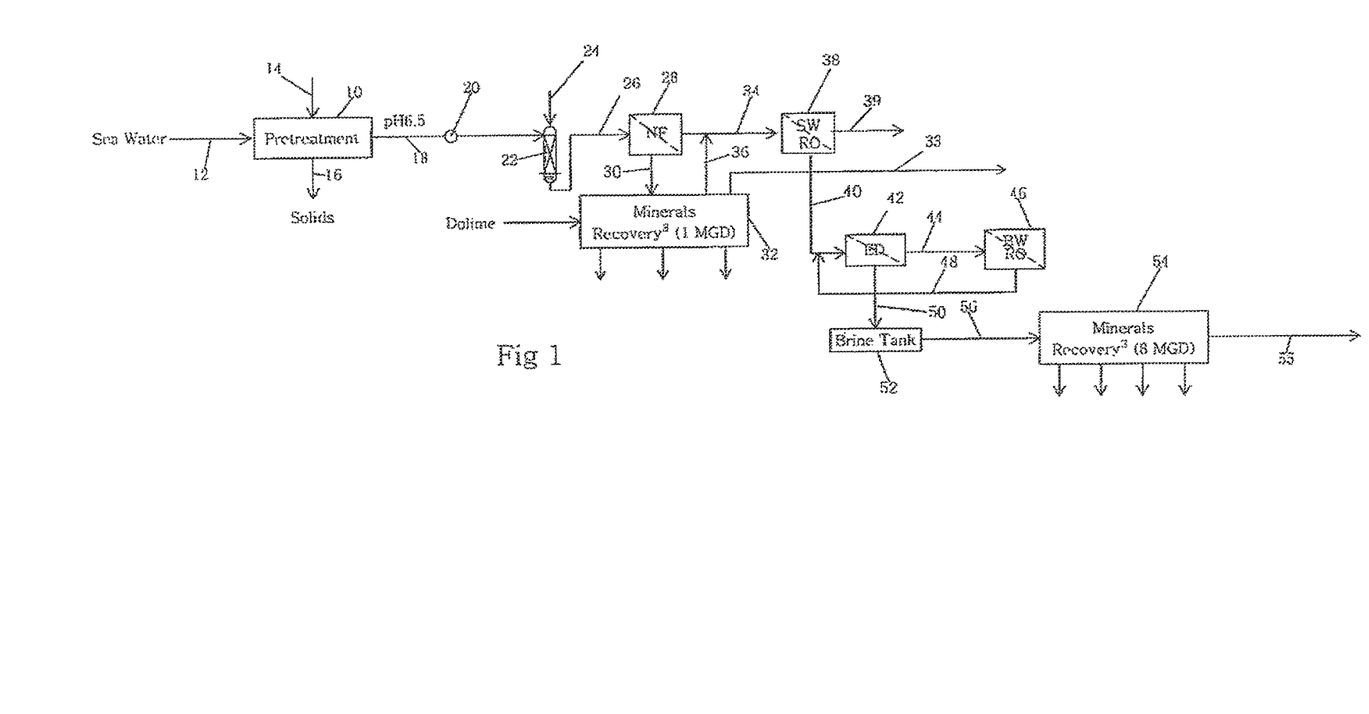
FIG. 1 is a diagram of a standalone desalination system utilizing EDR-RO integration for mineral recovery.

A multistage air or nitrogen stripper 22 is then used to reduce the $CO_2$ content in the feed water to below 5 ppm (preferably below 1 ppm). Mol sieves may be optionally used to reduce the $CO_2$ content in the stripping air.

Sodium bisulfite is added to the stripped feed water, as indicated at 26, to neutralize any residual hypochlorite, or hypobromite and the water is fed to a nanofiltration unit 28. The nanofiltration unit removes nearly all (90-99%) of the magnesium, calcium, and sulfate in a non-permeate stream, as indicated at 30 and removes very little of the boron. This stream is processed for minerals at the mineral recovery unit 32. An example of a mineral recovery system is shown and described in co-pending patent application Ser. No. 12/818,740, filed on Jun. 18, 2010, entitled: "Zero Discharge Water Desalination Plant with Minerals Extraction Integrated with Natural Gas Combined Cycle Power Generation", which is fully incorporated by reference herein. The mineral recovery unit, or MVR 32, produces agricultural grade gypsum from the sulfate and uses lime or dolime to precipitate high purity magnesium hydroxide. The MVR 32 comprises a non-selective anion and cation membrane with optional downstream diluate RO. Excess calcium is removed from the NF brine stream as a calcium chloride brine, flake or pellet product. A release stream 33 from MVR 32 comprises condensate at 2 MOD.

The NF permeate at 34 and the purge from the NF non-permeate minerals recovery system at 36 containing the monovalent salts is adjusted to pH 9-10 using caustic and routed to a seawater RO system 38. The elevated pH and temperature allow optimized flux and boron removal with low pressure drop RO membranes. Multiple stages of permeate and nonpermeate RO may be used depending on the feed water quality and desal water purity requirement.

The reject brine stream from the SWRO system at 40, preferably with 70-80 g/l TDS, is routed to an electrodialysis or electrodialysis reversal ED(R) unit 42, which operates at pH 9-10. The elevated pH converts most of the uncharged boric acid to monovalent borate, and the uncharged silica to silicate, allowing the ED(R) to capture most of these ions in the concentrate stream. The ED(R) diluate stream, at 44, preferably with 20 g/l TDS is pH adjusted to 9-10 using caustic and routed to a BWRO system 46, which produces desalinated water. The release stream 39 from SWRO 38 is RO permeate at 18 MGD.

The elevated pH and temperature allow optimized flux and boron removal. Multiple stages of permeate and non-permeate may be used depending on the feed water quality and desal water purity requirement. The BWRO membrane allows a lower pressure drop and higher recovery than the SWRO membranes, since it is optimized for the lower TDS in the feed and reject brine.

The reject brine from the BWRO system is recycled back to the ED(R) unit, as indicated at 48. Silica and boron do not build up in the recycle loop since most of the silica and boron fed to the ED(R) 42 is rejected with the concentrate due to the elevated pH.

ED(R) concentrate at 50, preferably with 230 g/l TDS, is routed to a brine storage tank 52 which facilitates off-peak salt production from the concentrate using mechanical vapor recompression (MYR) evaporators and crystallizers. The brine storage also allows the desalination plant to continue to operate when the downstream MVR units 54 experience a forced or planned outage. Brine storage is also provided within the NF non-permeate minerals recovery system to allow desalination plant operation when one of the components in the NF non-permeate minerals recovery system is down.

The ED(R) concentrate stream at 56, from the brine tank, is processed for minerals recovery as explained in aforementioned co-pending application Ser. No. 12/818,740. The MVR 54 produces high purity salt and recovers boron as high purity boric acid.

Figures 2, 3:
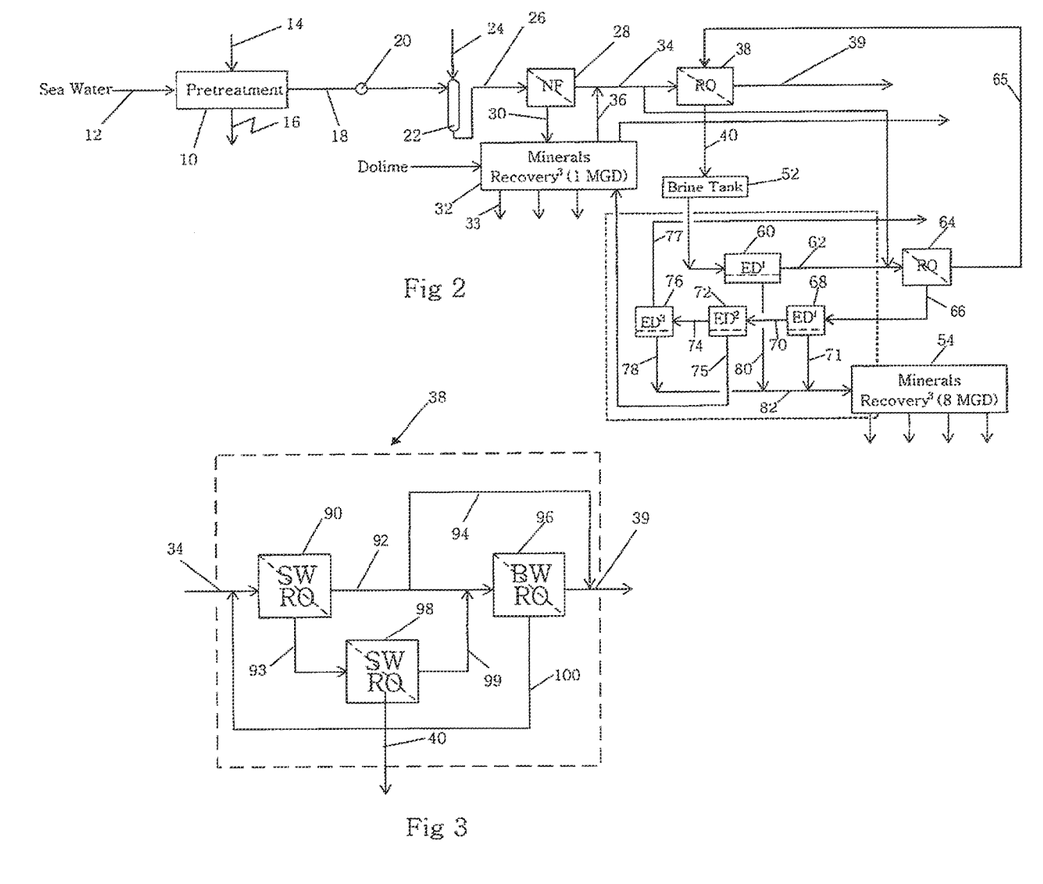
FIG. 2 is a detail of the reverse osmosis (RO) loop.
FIG. 3 is a diagram of an alternative standalone desalination system incorporating mineral recovery.

The RO detail is shown in FIG. 3. The NF permeate at 34 is introduced into the RO 38 as indicated in FIGS. 1 and 2, and is at a temperature of about 104° F. The RO 38 typically comprises the SWRO 90, the BWRO 96 and the SWRO 98. The stream at 34 is at pH 6 which is mixed with caustic and recycle stream 100 to increase the pH to 8.9. This is introduced into RO 90 which operates at pH 8-9. A primary release stream 97 is desalinated water. The secondary stream 93 is at pH 8-9 and is introduced into SWRO 98. The outlet stream 99 is combined with the primary release stream 97 and introduced into BWRO 96, which is at pH 10. A bypass loop 94 is also provided. The outlet stream from BWRO is at 39, as also indicated in FIGS. 1 and 2 as the outlet from SWRO system 38. Stream 100 from BWRO 96 is reintroduced into stream 34. Outlet stream 40 is introduced into ED 42 in FIG. 1 and brine tank 52 in FIG. 2.

Retrofit System

Figure 4:
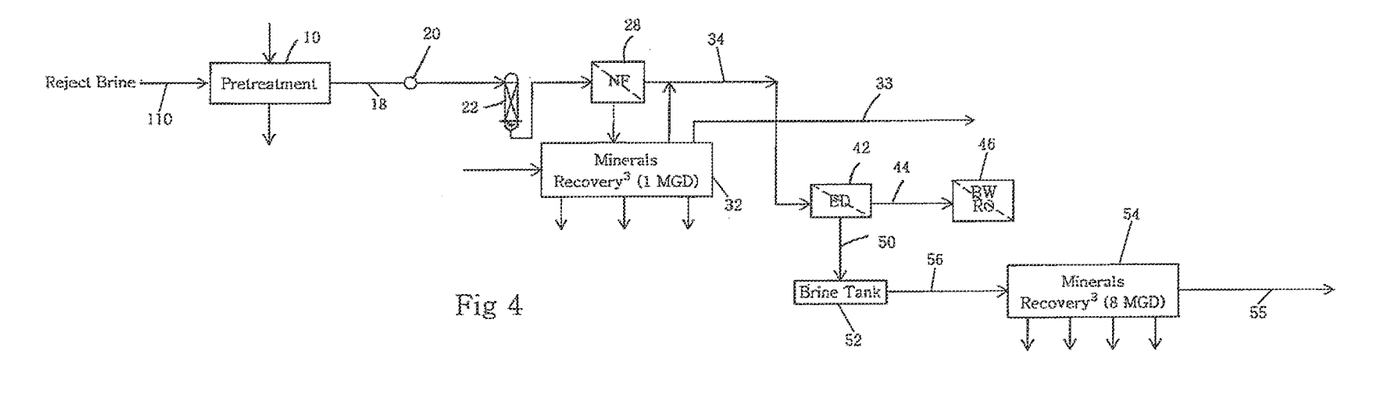
FIG. 4 is an example diagram for incorporating the mineral recovery system of the subject invention is an existing desalination plant.

Another embodiment of this invention is used as a retrofit on all or a portion of the reject brine stream of an existing desalination plant, as shown in FIG. 4. The reject brine feed stream 110 is adjusted to pH 6-6.5 using hydrochloric acid, sulfuric acid or caustic and is filtered (cartridge filter, or ultrafiltration) to remove any suspended solids, as indicated at the pretreatment unit 10. Then, as with the previously described embodiments, stream 18 is heated at preheater 20 and introduced into the air stripper 22. The NF 28, MVR 32, ED 42, BWRO 46, brine tank 52 and MVR 54 perform as previously described.

The residual filter purge solid stream is routed back to the RO unit solids disposal line (not shown) or to a solids settling and filtration system included in the pretreatment section that produces byproduct solids. The pH adjustment minimizes soluble silica in the feedwater to prevent downstream membrane fouling.

The feed water stream is processed the same as the standalone embodiment except the seawater RO block 38 is not used. The elevated TDS NF permeate stream 34 is fed directly to the ED(R) unit 42. The flow scheme downstream of the ED(R) unit is the same as the standalone embodiment. No streams are recycled to the existing desalination plant.

Calcium and Magnesium Purge System

Another embodiment of this invention is used to produce a salt brine with a further reduced calcium and magnesium content, using higher efficiency ED membranes for the bulk of the salt concentration, and follows the configuration of FIG. 2.

This embodiment is substantially identical to the embodiment of FIG. 1 from the sea water intake at 12 through the SWRO unit 38. However, in this embodiment the reject brine stream 40 from the SWRO 38 is first introduced into the brine tank 52 and from there into ED 60, which comprises a monovalent selective cation membrane for Na and K passage and a non-selective anion membrane for Cl, Br, $B(OH)_4$, $CO_3$, and $SO_4$ passage. This releases a stream 62 at 7.7 MGD and 20 g/l TDS into the RO 64, and a second stream 80 at 2.5 MGD and 270 g/l TDS for introduction into the MVR 54. The RO produces a stream at 66 which is at 1.9 MGD and 70 g/l TDS. This is introduced into a series of ED's 68, 72 and 76. The release streams from these ED's is as follows:

ED 68: stream 70 at 1.5 MGD and 15 g/l TDS; stream 71 at 0.4 MGD and 270 g/l TDS.
ED 72: stream 74 at 1.2 MGD and 70 g/l TDS; stream 75 at 0.35 MGD and 270 g/l TDS.
ED 76: stream 77 at 1.1 MGD and 0.2 g/l TDS; stream 78 at 0.1 MGD and 10 g/l TDS.

Stream 75 is fed back into the first minerals recovery system 32.

Streams 71 and 78 are combined with stream 80 from ED 60 to form combination stream 82, which includes Na, K, $SO_4$, $HCO_3$, $B(OH)_4$, and is at a pH 6-7. This is introduced into the MVR 54 for recovering high purity salt at approximately 3300 s TPD, high purity potassium chloride at 100 s TPD, high purity bromine at 8 s TPD and high purity Boric acid at 2 s TPD. The release stream 55 from MVR 54 comprises condensate at 3.5 MGD ED 60, and ED 68 comprise a monovalent selective cation membrane for passing Na and K and a non-selective anion membrane for Cl, $SO_4$, $HCO_3$, Br passage. ED 72 comprises a monovalent selective anion membrane for Cl passage and a non-selective cation membrane for Na, Ca and Mg passage. ED 76 comprises a non-selective anion and cation membrane with optional downstream diluate RO (with the RO brine recycled back to ED).

First Stage ED 60:

The reject brine 40 from the RO unit is pH adjusted with HCl to pH 8 and is fed to a brine tank 52 that is filled during on-peak power price conditions (typically 8 hours per day) and emptied during off-peak power conditions. During off-peak power conditions RO brine from the tank is fed to the first stage ED 60 which is equipped with monovalent cation permselective membranes and monodivalent anion permselective membranes. The first stage ED 60 is operated at pH 8-8.5 which allows higher efficiency anionic ED membranes, which are not compatible with high pH operation. Most (>85-98%) of the calcium and magnesium, boric acid and silica remain in the diluate stream. Most (70-90%) of the salt, potassium chloride, sodium bromide are extracted into the brine concentrate stream.

The first stage ED brine concentrate is routed to an evaporation section where salt, potassium chloride, bromine and boric acid are recovered from the brine. The first stage ED diluate is pH adjusted to pH 8 with HCl and is routed to a two stage RO unit.

Two Stage RO Unit 64:

The first stage of RO 38 removes essentially all (>99%) of the dissolved salts (NaCl, KCl, NaBr, $CaHCO_3$, $MgHCO_3$) and most of the boric acid (75-85%). The permeate from the first stage is pH adjusted to pH 10 with caustic and fed to the second stage RO. Operation of the second stage at pH 10 enables near complete removal (98%) of the residual boric acid as sodium borate. Calcium or magnesium scale does not form in the second stage due to the low residual concentrations of calcium, and magnesium. The second stage RO brine stream 66 is pH adjusted to 8 with HCl and recycled to the first stage RO 38. The second stage RO permeate 65 is routed to the desalinated product water.

The first stage RO brine is fed to the second stage ED unit 68. The first and second stage RO units remove approximately 65% of the water from the first stage ED diluate as desalinated product water. During on-peak operation the primary ED unit does not produce diluate (internal recirculation only) and a portion (10-20%) of the seawater RO feed is routed to the RO unit. This minimizes on-peak RO power consumption due to the increased membrane area, and enables continuous operation of both seawater and ED diluate RO units.

Second Stage ED 68:

The first stage RO brine at pH 8 is fed to the second stage ED 68 which uses the same membrane types as the first stage ED 60. The second stage ED concentrate brine is also routed to the evaporation section with the first stage ED brine.

Third Stage ED 72:

The second stage ED diluate 70 is routed to the third stage ED unit 72 which also operates at a pH 8 and uses monodivalent cation permselective membranes and mono anion permselective membranes. The third stage ED concentrate stream contains calcium, magnesium, and sodium chloride is routed to the magnesium and calcium recovery section of the plant. The diluate stream from the third stage ED diluate stream containing sodium chloride and residual sulfate, boron (as undissociated boric acid), and silica is pH adjusted to 9.5-10.5 using caustic and routed to the fourth stage ED unit.

Fourth Stage ED 76:

The fourth stage ED unit 76 uses monodivalent cation permselective membranes and monodivalent anion permselective membranes to produce a desal product water diluate stream. Optionally the desal product water diluate can be routed to a polishing RO unit to further reduce the sodium borate content in the product desalinated water, with the RO brine recycled back to the fourth stage ED unit 76. The fourth stage ED concentrate stream 78 containing mainly sodium chloride, sodium borate and sodium silicate is routed to the evaporation section, MVR 54.

Optionally an ion exchange resin operating at pH 9-10 (not shown in FIG. 2) can be added upstream of the fourth stage ED to capture boric acid and the silica rich fourth stage ED concentrate stream 78 recycled to the inlet pretreatment section. The boric acid purge stream from the ion exchange resin is pH adjusted to 6-7 with NaOH and fed separately into the minerals recovery section for boric acid recovery, as explained in aforementioned co-pending application Ser. No. 12/818,740. This reduces the silica and boric acid loading in the MVR and increases the salt content in the MVR feed.

Key Benefits

The key benefits of this invention are summarized below:
1) Uses a dedicated low pressure drop brackish water RO at pH 9-10. to produce high quality desalinated water from ED(R) diluate at lower energy consumption than seawater RO membranes.

2) Provides zero discharge seawater desalination without buildup of boron which can cause contamination of the desalinated water.
3) Provides zero discharge seawater desalination without buildup of silica which can cause membrane scaling and fouling.
4) Does not require specialty monovalent ED(R) membranes.
5) Can be used to as a retrofit system on an existing RO plant. The system would divert all or a portion of the RO reject brine stream from disposal to an ED(R)/BWRO based system that uses an acidic air stripping, NF and Katana NF brine mineral recovery system to pretreat the ED(R) feed.
6) Produces desalinated water low in boron with the option to recover boron as byproduct boric acid.
7) Recovers sulfate as an agricultural grade gypsum byproduct.
8) Recovers essentiality all of the magnesium as high purity magnesium hydroxide (without boron or gypsum contamination) using low cost dolime to precipitate the magnesium hydroxide.
9) Does not produce a mixed calcium carbonate, magnesium hydroxide softener sludge for disposal. Essentially all of the calcium is recovered as either agricultural gypsum or byproduct calcium chloride.

Additional Benefits of the Calcium and Magnesium Purge Embodiment

1) Produces a salt brine with a lower $CaCl_2$ and $MgCl_2$ content which reduces the boiling point elevation in the salt crystallizer. This reduces the capital cost and power consumption of the salt crystallizer. The salt brine can also be cost effectively polished before evaporation with cation exchange resins to essentially eliminate the residual Ca and Mg from the salt brine. This enables the production of high value, high purity, chemical grade salt (>99.995% purity).
2) Uses a mono and divalent anion permselective ED membranes and monovalent cation permselective ED membranes which reduces membrane resistance by 50% versus the monoselective anion and cation permselective ED membranes typically used for salt brine production. This also reduces gypsum and calcium carbonate fouling since sulfate, bicarbonate and carbonate is directed to the concentrate and calcium is directed to the diluate, preventing calcium sulfate, or calcium carbonate concentration increase and gypsum or carbonate scaling in the ED unit.
3) Enables economical use of boric acid ion exchange resin at optimal pH of 9-10 on a small stream (<5% of feed) with elevated boric acid content (20 times feed seawater). This concentrates the boric acid into a high concentration (2 wt % boric acid) small 0.04 MGD purge stream suitable for boric acid recovery.

While certain features and embodiments of the invention have been described in detail herein it should be understood that the invention encompasses all modifications and enhancements within the scope and spirit of the attached claims.

I claim:
1. A system, comprising:
a nanofiltration (NF) unit configured to separate seawater into a first non-permeate and a first permeate, wherein the first non-permeate comprises first minerals and the first permeate comprises second minerals;
a first stage mineral recovery unit disposed downstream from and fluidly coupled to the NF unit, wherein the first stage mineral recovery unit is configured to receive the first non-permeate and to capture at least a portion of the first minerals;
a second stage mineral recovery unit disposed downstream from and fluidly coupled to the NF system and the first stage mineral recovery unit, wherein the second stage mineral recovery unit is configured to capture second minerals, wherein the second stage mineral recovery unit comprises an electrodialysis (ED) system configured to receive at least a portion of the first permeate and to generate a diluate and a concentrate from the first permeate, and the concentrate comprises the second minerals, wherein the ED system comprises at least one non-selective ED unit;
a first flow path fluidly coupling the first stage mineral recovery unit and a dolime source, wherein the first flow path is configured to supply the first stage mineral recovery unit with dolime such that at least one of the first minerals recovered in the first stage mineral recovery unit is magnesium hydroxide; and a first reverse osmosis (RO) system fluidly coupled to the ED system, wherein the first RU system is configured to receive the concentrate from the ED system and to generate a first brine and a second permeate.
2. The system of claim 1, comprising a second flow path between the first RO system and a second RO system, wherein the second flow path directs the second permeate from the first RO system to the second RO system, and wherein the second RO system is fluidly coupled to the NF unit and the second stage mineral recovery unit.
3. The system of claim 2, wherein the second RO system comprises a plurality of RO units, wherein at least one RO unit of the plurality of RO units is fluidly coupled to the NF unit and a second RO unit of the plurality of RO units is fluidly coupled to the ED system.
4. The system of claim 2, comprising a brine tank fluidly coupled to the second RO system and to the second stage mineral recovery unit, wherein the brine tank is configured to receive a second brine from the second RO system and to supply the second brine to the ED system.
5. The system of claim 1, wherein the ED system comprises a plurality of ED units, wherein at least one ED unit of the plurality of ED units comprises a monovalent cation selective permeable membrane.
6. The system of claim 5, wherein at least one ED unit of the plurality of ED units is fluidly coupled to the first stage mineral recovery unit.
7. The system of claim 1, comprising a brine tank disposed within the second stage mineral recovery unit and fluidly coupled to the ED system, wherein the brine tank is configured to receive the concentrate from the ED system.
8. A system, comprising:
a nanofiltration (NF) unit configured to separate seawater into a first permeate and a first non-permeate, wherein the first non-permeate comprises first minerals and the first permeate comprises second minerals;
a first stage mineral recovery unit disposed downstream from and fluidly coupled to the NF unit, wherein the first stage mineral recovery unit is configured to receive the first non-permeate from the NF unit and to capture at least a portion of the first minerals;
a second stage mineral recovery unit disposed downstream from and fluidly coupled to the NF unit, wherein the second stage mineral recovery unit is configured to receive at least a portion of the first permeate and to capture the second minerals, the second stage mineral recovery unit comprises a multi-stage electrodialysis

(ED) system comprising a first ED unit and a second ED unit, the first ED unit is configured to separate the first permeate into a diluate and a concentrate, the concentrate comprises the second minerals, wherein at least one of the first ED unit, the second ED unit, or both is a non-selective ED unit;

a first reverse osmosis (RO) system fluidly coupled to the second stage mineral recovery unit, wherein the first RO system is configured to receive the diluate from the first ED unit and to generate a first brine and a second permeate; and a first flow path between the first RO system and the second ED unit, wherein the first flow path is configured to supply the first brine to the-second ED unit.

9. The system of claim 8, comprising a second flow path fluidly coupling the first stage mineral recovery unit and a dolime source, wherein the second flow path is configured to supply the first stage mineral recovery unit with dolime such that at least one of the first minerals recovered in the first stage mineral recovery unit is magnesium hydroxide.

10. The system of claim 8, comprising a second RO system fluidly coupled to the NF unit, the first RO system, and the second stage mineral recovery unit, wherein the second RO system is configured to receive the third second permeate from the first RO system and at least a portion of the first permeate from the NF system, to generate desalinated water and a second brine stream, and to supply the second brine stream to the multi-stage ED system.

11. The system of claim 8, comprising an air stripper fluidly coupled to the NF unit, wherein the air stripper is configured to remove carbon dioxide from the seawater.

12. The system of claim 8, wherein at least one of the first ED unit or the second ED unit comprises at least one monovalent cation selective permeable membrane or at least one anion selective permeable membrane.

13. The system of claim 8, comprising a third flow path between the first stage mineral recovery unit and the second stage mineral recovery unit, wherein the third flow path is configured to direct at least a portion of the concentrate from the first ED unit to the first stage mineral recovery unit.

14. The system of claim 8, comprising a brine tank fluidly coupled to the second stage mineral recovery unit, wherein the brine tank is configured to receive and to supply the first permeate to the second stage mineral recovery unit.

15. The system of claim 8, comprising a brine tank disposed within the second stage mineral recovery unit and fluidly coupled to the multi-stage ED system, wherein the brine tank is configured to receive the concentrate from the multi-stage ED system.

16. A system, comprising:
a first stage mineral recovery unit disposed downstream from and fluidly coupled to a nanofiltration (NF) unit, wherein the first stage mineral recovery unit is configured to receive a first non-permeate having first minerals from the NF unit and to capture at least a portion of the first minerals;

a first flow path fluidly coupling the first stage mineral recovery unit and a dolime source, wherein the first flow path is configured to supply the first stage mineral recovery unit with dolime such that at least one of the first minerals recovered in the first stage mineral recovery unit is magnesium hydroxide;

a second stage mineral recovery unit disposed downstream from the NF unit and the first stage mineral recovery unit, wherein the second stage mineral recovery unit is configured to capture second minerals from a first permeate generated by the NF unit, and the second stage mineral recovery unit comprises a multi-stage electrodialysis (ED) system, wherein the multi-stage ED system comprises at least one non-selective ED unit; and a first reverse osmosis (RO) system disposed downstream from and fluidly coupled to the second stage mineral recovery unit, wherein the first RO system is configured to receive a diluate generated by the multi-stage ED system and to generate a first brine and a second permeate.

17. The system of claim 16, comprising a second RO system fluidly coupled to the NF unit, the second stage mineral recovery unit, and the first RO system, wherein the second RO system is configured to receive the second permeate, to generate a second brine and desalinated water, and to direct the second brine to the second stage mineral recovery unit.

18. The system of claim 16, comprising a second flow path between the first RO system and the second stage mineral recovery unit, wherein the second flow path directs the first brine to the multi-stage ED system.

* * * * *